United States Patent [19]

Stine

[11] 4,037,058

[45] July 19, 1977

[54] INTERCOM SYSTEM FOR A KEY TELEPHONE SYSTEM

[75] Inventor: Robert David Stine, Etters, Pa.

[73] Assignee: International Telephone and Telegraph Corporation, Nutley, N.J.

[21] Appl. No.: 683,877

[22] Filed: May 6, 1976

[51] Int. Cl.$^2$ .......................................... H04M 9/06
[52] U.S. Cl. ................... 179/99; 179/84 SS; 179/18 AD; 179/37
[58] Field of Search ............... 179/1 H, 18 AD, 99, 179/37–40, 84 SS, 84 R, 84 A, 18 HB, 18 AD

[56] References Cited

U.S. PATENT DOCUMENTS

| | | | |
|---|---|---|---|
| 3,014,097 | 12/1961 | Apt | 179/18 AD |
| 3,406,260 | 10/1968 | McEowen | 179/37 |
| 3,524,931 | 8/1970 | Cartwright et al. | 179/37 |
| 3,725,594 | 4/1973 | Cartwright et al. | 179/18 HB |
| 3,739,100 | 6/1973 | Cartwright | 179/18 HB |
| 3,909,551 | 9/1975 | Marshall | 179/84 SS |

Primary Examiner—Kathleen H. Claffy
Assistant Examiner—Gerald L. Brigance
Attorney, Agent, or Firm—John T. O'Halloran; Alfred C. Hill

[57] ABSTRACT

A control circuit including a mechanical interrupter provides a plurality of interrupted ringing signal bursts when one of a plurality of intercom stations goes off-hook and first initiates a call to another of the plurality of intercom stations. The interrupter also provides an interrupted voltage to cause a button lamp at the another of the plurality of intercom stations to flash. A call selector circuit and a call routing circuit are coupled to the control circuit and the plurality of intercom stations to provide a connection between the one and the another of the plurality of intercom stations to enable the interrupted ringing signal bursts to be conducted on the connection to the another of the plurality of intercom stations. Logic circuitry is coupled to the plurality of intercom stations and the control circuit to detect when the one and the another of the plurality of intercom stations are both off-hook. When this condition is detected the interrupted ringing signal bursts are stopped and the button lamp is caused to glow steadily.

11 Claims, 4 Drawing Figures

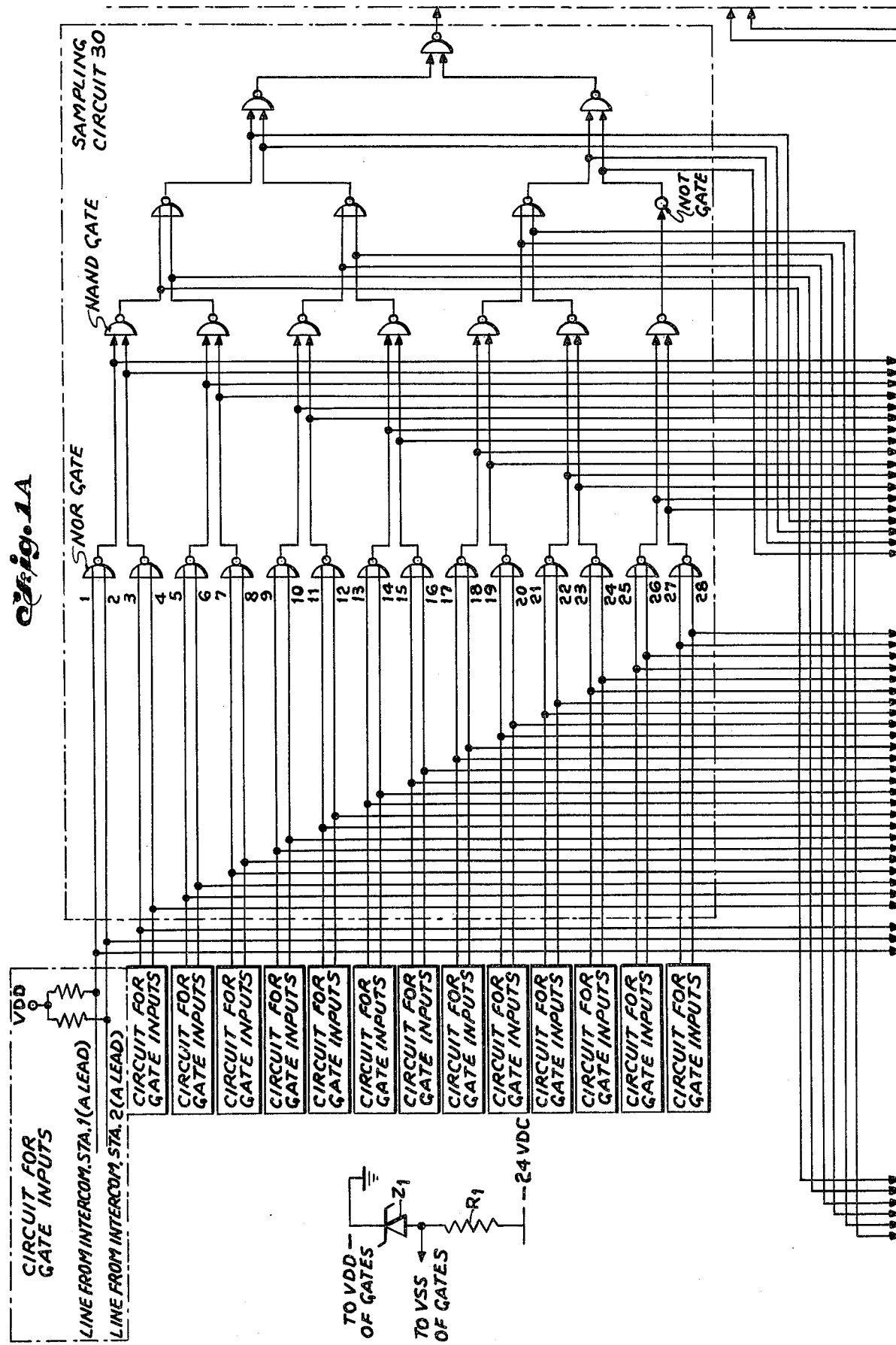

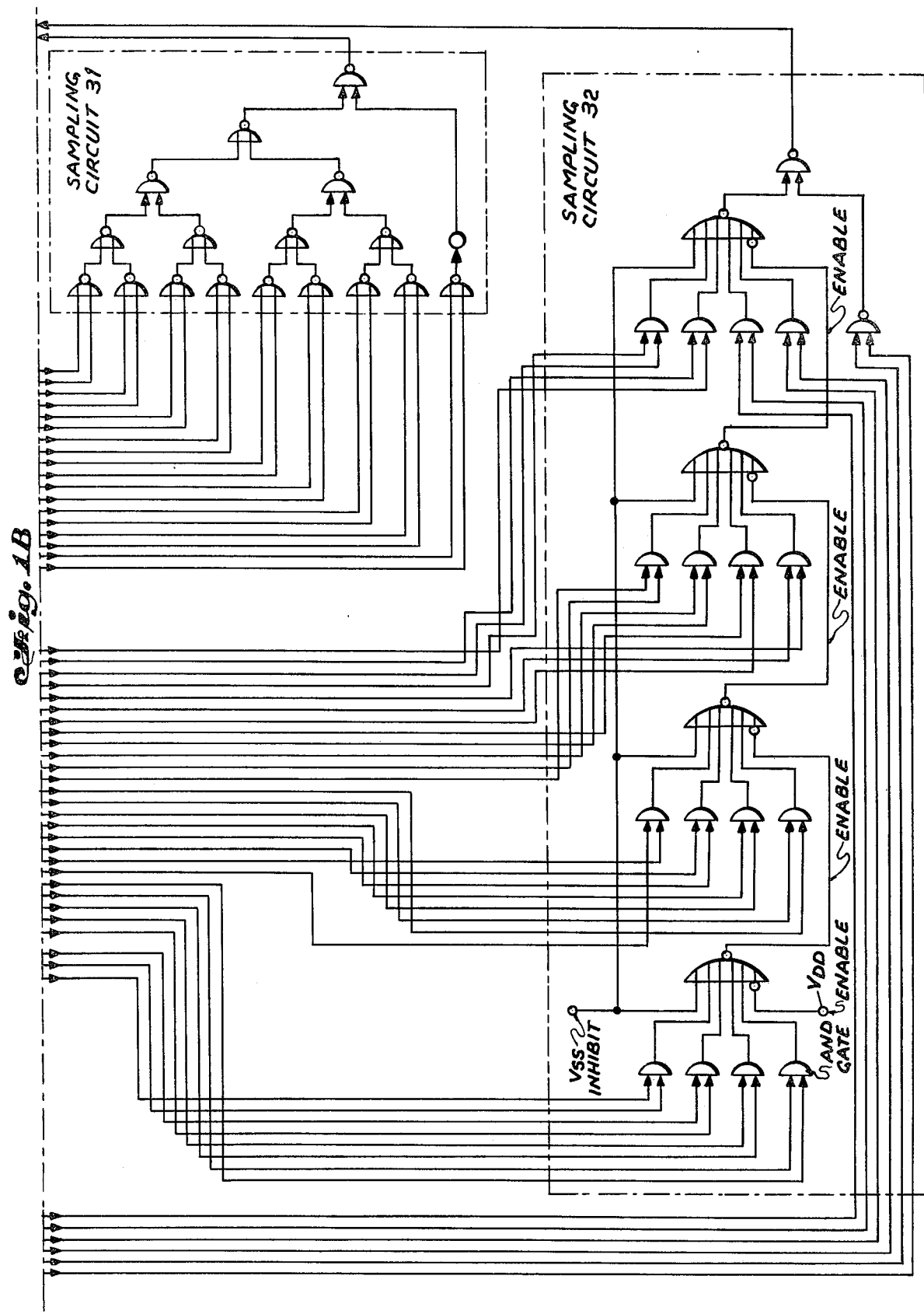

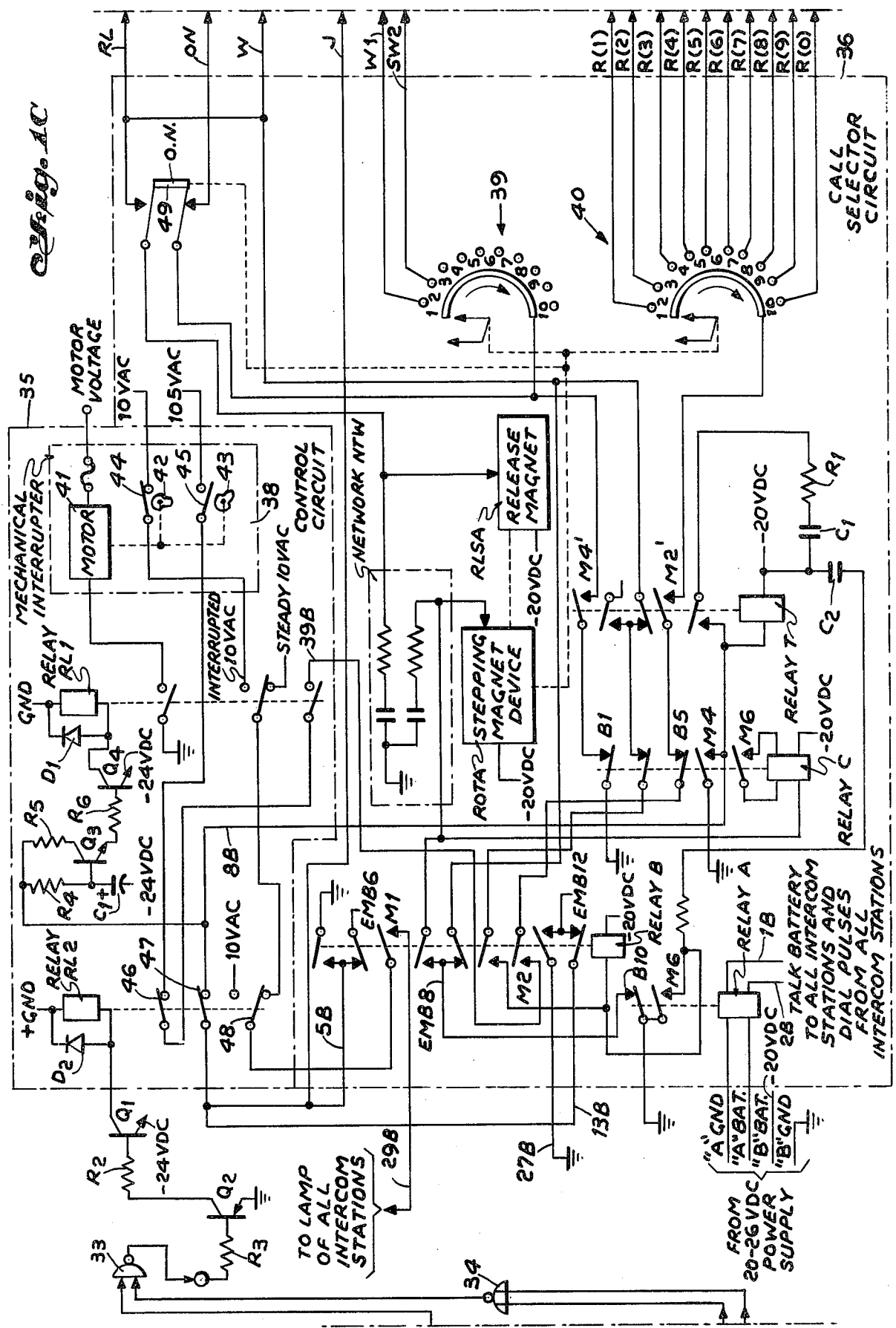

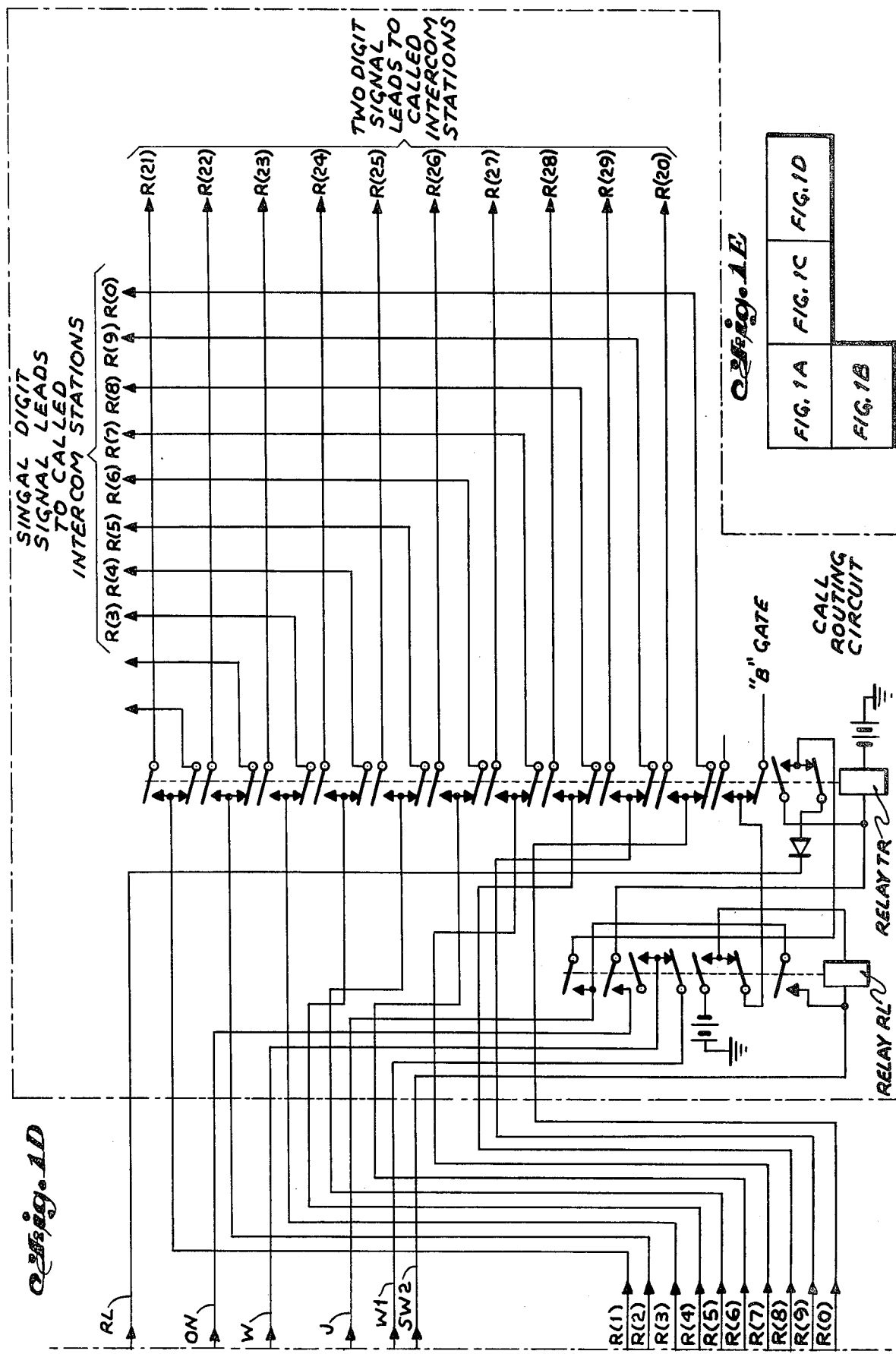

INTERCOM SYSTEM FOR A KEY TELEPHONE SYSTEM

BACKGROUND OF THE INVENTION

This invention relates to intercom systems and more particularly to an intercom system for a key telephone system.

The telephone industry presently offers a K1A2 key telephone system consisting of a basic pre-wired mounting package that is designated as a key service unit. It contains provisions to receive associated "plug-in" units in varying combinations to meet subscriber requirements.

One feature of this key system is a rotary dial intercom. The intercom unit provides a single common talking path for all stations in the system. When a call is initiated, the system provides a steady busy lamp signal at all locations and causes a single burst of ringing signal at the called station only. If the called station does not answer, the calling station must re-dial the number in order to initiate a second ring burst at the called station. This requirement of re-dialing, of course, is a disadvantage.

SUMMARY OF THE INVENTION

An object of the present invention is to overcome the above-mentioned disadvantage of the prior art common path intercom systems for a key telephone system.

A feature of the present invention is the provision of an intercom system having a plurality of intercom stations comprising: first means to provide a plurality of interrupted ringing signal bursts when one of the plurality of intercom stations goes off-hook and first initiates a call to another of the plurality of intercom stations; second means coupled to the first means and the plurality of intercom stations to provide a connection between the one of the plurality of intercom stations and the another of the plurality of intercom stations, the interrupted ringing signal bursts being conducted on the connection to the another of the intercom stations; and third means coupled to the first means and the plurality of intercom stations to stop the interrupted ringing signal bursts when the another of the plurality of intercom stations goes off-hook.

Another feature of the present invention is the provision of the above-mentioned first means further providing an interrupted voltage for coupling to the other of the plurality of intercom stations to cause a button lamp of the other of the plurality of intercom stations to flash and to provide a steady voltage for coupling to the other of the plurality of intercom stations to cause the buttom lamp to glow steadily when the other of the plurality of intercom stations goes off-hook.

BRIEF DESCRIPTION OF THE DRAWING

Above-mentioned and other features and objects of this invention will become more apparent by reference to the following description taken in conjunction with the accompanying drawing, in which:

FIGS. 1A-1D, when organized as illustrated in FIG. 1E, is a block diagram of the intercom system in accordance with the principles of the present invention.

DESCRIPTION OF THE PREFERRED EMBODIMENT

The intercom system described hereinbelow will operate under control of a call initiating apparatus, such as a dial or push buttons with their associated circuitry, to generate a call initiating signal. To facilitate the description of the intercom system of the present invention, the calling initiating apparatus will be considered as a dial and the call initiating signal will be dial pulse. However, the intercom system will operate as well with push button call initiating apparatus.

The intercom system of the present invention provides many interrupted ringing signal bursts at the called station upon the first initiation of a call and at the same time will cause button lamp at the called station to flash to indicate to the called station which intercom line should be answered. When the called party picks up (goes off-hook), the interrupted signal bursts stop and the flashing lamp glows steadily. The intercom system is returned to normal (standby) status when the calling party goes on-hook.

Briefly, the intercom system of this invention includes a logic circuit having sampling circuits 30, 31 and 32 interconnected as illustrated in FIGS. 1A and 1B, combining gates such as NAND gate 33 and NOR gate 34 and transistors Q1 and Q2 as illustrated in FIG. 1C, control circuit 35 as illustrated in FIG. 1C, call selector circuit 36 as illustrated in FIG. 1C and call routing circuit 37 as illustrated in FIG. 1D.

The sampling circuits 30 – 32 samples a maximum of 28 intercom stations by monitoring the A lead in each intercom line. The objectives are to saturate transistors Q1 and Q2 and operate relay RL2 when two or more intercom stations are off-hook.

Sampling circuit 30 includes 17 NOR gates, 10 NAND gates and one inverter. Sampling circuit 31 includes 14 NOR gates, three NAND gates and one inverter. Sampling circuit 32 includes 16 AND gates, four NOR gates and two NAND gates. Twenty-eight resistors are coupled to gate inputs 1 – 28 and terminated to voltage VDD to avoid any input from being undefined. Sampling circuits 31 and 32 have a logic 1 output when two or more stations are detected off-hook while sampling circuit 30 has a logic 0 output when two or more stations are detected off-hook. The three sampling circuits are gated together in NAND gate 33 and NOR gate 34 in such a manner as to allow any one of the three sampling circuits to activate transistors Q1 and Q2 when two or more stations are off-hook.

Zener diode Z1 and resistor R1 shown in FIG. 1A supply the logic circuitry with a regulated 10 VDC (direct current voltage). Resistors R3 and R2, shown in FIG. 1C, serves as a bias resistor for transistors Q1 and Q2.

Control circuit 35 includes two relays RL1 and RL2 and a 4 second timing circuit consisting of transistors Q3 and Q4, capacitor C1 and resistors R4, R5, R6. The control circuit 35 has the function of controlling the mechanical interrupter 38 and the call selector circuit 36. Diodes D1 and D2 are shunted across relays RL1 and RL2, respectively, for transient suppression.

The talk battery (the "A" battery) is fed to all stations via relay A and conductors 2B and 1B. When a station goes off-hook to initiate a call, the talk battery is placed on the tip and ring conductors of the intercom phone. When dialing a called station, the dialing pulses pulse the battery fed relay A. This steps the mechanical actuated wipers of selector switch banks 39 and 40 by pulsing the stepping magnet device ROTA via contacts EBM8 of relay B and the B10 contact of relay A. When the called station answers, in other words, goes off-hook, the selector switch banks 39 and 40 are permitted to home by de-energizing relay T and energizing release magnet RLSA.

The mechanical interrupter 38 is an electro-magnetic device including motor 41 and cams 42 and 43. When motor 41 is energized, cams 42 and 43 are rotated which open and close contacts 44 and 45, respectively.

When a station goes into an off-hook condition to initiate a call, this activates the relay A in circuit 36 which actuates relay B through contact M6. Ground on a contact EM12 of relay B is connected to terminal 13B. This ground through contact 47 of relay RL2 keys the timing circuit which after 4 seconds delay activates relay RL1 and, hence, closes its associated contacts to actuate interrupter 38. This provides interrupted voltage for button lamp flashing and interrupted ringing signal bursts when circuits 36 and 37 have selected the proper intercom station line corresponding to the dialed number. Also during the 4 second time delay a steady 10 VAC is applied to the lamp buttons.

When the connection has been made, relay T remains actuated by the ground being applied to terminal 8B from contact 47 of relay RL2 which is connected to terminal 13B of circuit 36. The above connection prohibits the stepping switch from homing, that is, returning to its initial or normal position, thereby holding the connection to allow the interrupted ringing signal bursts to be conducted to the called intercom station.

When the output of transistor Q2 actuates relay RL2 the following occurs. Relay RL1 is de-energized which stops interrupter 38. Ground is removed from terminal 8B of circuit 36 which de-energizes relay T, allowing the wipers of selector switch banks 39 and 40 to "home". The 10 VAC (alternating current voltage) applied to terminal 29B through contact 48 of relay RL2 provides a steady glow for the button lamp in the called intercom station.

When the two stations go back on-hook, relay RL2 de-energizes and the intercom system is returned to its normal or rest position.

The stepping magnet device ROTA includes a rotating magnet to rotate a toothed disc which is held in each stepped position by a lever engage a tooth of the disc. The disc is connected to the wipers of selector switch banks 39 and 40 with the wipers making connection to the output terminals thereof. To assist the selector switch banks 39 and 40 to come to a "home" position, release magnet RLSA lifts the lever from the engaged tooth in the disc of the stepping magnet device ROTA enabling the wipers of selector switch banks 39 an 40 to return to their normal or home position.

A more detailed description of the intercom circuit of the present invention will now be set forth. For line seizure, a call is initiated by lifting the telephone handset of the calling intercom station and pressing a line pickup button associated with an idle intercom line. This operation provides a circuit to operate relay A through the tip and ring conductors of the telephone handset. The relay A in operating, operates relay B through contact M6. With relay B operates, contact M1 energizes the button lamps. The lamps associated with particular intercom line will be provided with a steady 10 VAC for 4 seconds at terminal 29B; after 4 seconds an interrupted 10 VAC is applied to terminal 29B. Energizing relay A and B prepares a pulsing circuit for the stepping magnet device ROTA. This pulsing circuit is established through the contacts B10 of relay A and contacts EBM8 of relay B.

Station selection and signalling may be provided by dialing a single digit station code. As the digit is dialed, the circuit through relay A is intermittently opened and closed, causing relay A to release and reoperate in unison with the dial pulses. The slow releasing relay B remains operated during pulsing. As relay A pulses, ground is connected under control of relay B to the rotary magnet of device ROTA, causing the wipers of selector switch banks 39 and 40 to step to a position corresponding to the digit dialed.

The slow releasing relay C operates on the first release of relay A and remains operated during the pulse train via contacts EBM8 of relay B and contact B10 of relay A. Relay C in operating, operates relay T through contact M4, which in turn connects the resistor R1 and capacitor C1 across the winding of relay T. During pulsing, capacitor C1 charges through resistor R1.

When the series of dial pulses is completed, relay A reoperates and relay C releases. The relay C in releasing connects a ground signal to selector switch bank 39 under control of relay T via contact B7 of relay C and contact M4' of relay T. The interrupted ringing signal bursts are connected to selector switch bank 40 via terminal 39B, contact M2 of relay B, contact B5 of relay C and contact M2' of relay T. One "R" lead of the plurality of "R" leads at the output of selector switch bank 40 is selected according to the single digit dialed enabling the interrupted ringing signal bursts to be coupled through the selected "R" lead to call routing circuit 37 and, hence, through the appropriate one of the normally closed contacts of relay TR to the appropriate single digit signal lead and from there to the selected called intercom stations.

Intercom stations associated with two-digit codes are selected by first dialing the ten's digit transfer code followed by the unit's digit. The numbers used for the ten's digit may not be used for the single digit codes. As the transfer code is dialed, the relays A, B, C and T and the selector switch banks 39 and 40 operate as described previously. As soon as the series of dial pulses is completed, relay C releases, connecting a ground signal to one of the associated transfer circuits operating the relay RL under control of lead SW2, the selector switch bank 39, contact M4' of relay T and contact B7 of relay C. When relay RL is operated, it locks under control of contact EMB6 of relay B via wire J. Relay RL connects an operating path to the release magnet RLSA under control of relays B and TR, the lead RL and the off-normal contacts of switch 49 which has been moved to the position opposite to that shown by a cam surface on the toothed disc of device ROTA. This completes an operating path to relay TR under control of the off-normal contacts of switch 49 and the lead ON. The release of switch 49 will cause relay TR to actuate. When relay TR is actuated, it locks up under control of relays RL and B. The relay TR when operated transfers the "R" leads connected to selector switch bank 40 by removing the connection of the contacts of relay TR from single-digit code stations and moving the contacts of relay TR to the position opposite to that shown and, hence, to a group of two-digit code stations as illustrated in FIG. 1D.

When the units digit is dialed and as soon as the series of dial pulses is completed, the interrupted ringing signal burst is connected to the called station under control of contact of relay TR.

When the called station has been properly routed through circuits 36 and 37, the relay T remains actuated by the ground being applied to terminal 8B. This ground is supplied through the closed contact 47 of relay RL2 which is connected to terminal 13B of circuit 36. The above connection prohibits the wipers of stepping switch banks 39 and 40 from homing, thereby, holding the connection to allow interrupted ringing signal bursts to be connected to the called intercom station.

When relay RL2 is actuated by the output of NAND gate 33, the following occurs. Relay RL1 is de-energized which stops interrupter 38. Ground is removed from terminal 8B of circuit 36 which de-energizes relay T allowing the wipers of selector switch banks 39 and 40 to "home" and a 10 VDC is applied to terminal 29B which gives a steady lamp condition at the called subscriber substation.

When the two stations go back on-hook, relay RL2 de-energizes and the intercom system returns to normal to await the next desired intercom call.

Network NTW in circuit 36 coupled to device ROTA and magnet RLSA is used for suppression of spiking.

While I have described above the principles of my invention in connection with specific apparatus it is to be clearly understood that this description is made only by way of example and not as a limitation to the scope of my invention as set forth in the objects thereof and in the accompanying claims.

I claim:

1. An intercom system having a plurality of intercom stations comprising:
    first means to provide a plurality of interrupted ringing signal bursts when one of said plurality of intercom stations goes off-hook and first initiates a call to another of said plurality of intercom stations;
    second means coupled to said first means and said plurality of intercom stations to provide a connection between said one of said plurality of intercom stations and said another of said plurality of intercom stations, said interrupted ringing signal bursts being conducted on said connection to said another of said intercom stations; and
    third means coupled to said first means and said plurality of intercom stations to stop said interrupted ringing signal bursts when said another of said plurality of intercom stations goes off-hook;
    said first means further providing an interrupted voltage for coupling to said other of said plurality of intercom stations to cause a button lamp at said other of said plurality of intercom stations to flash and to provide a steady voltage for coupling to said other of said plurality of intercom stations to cause said button lamp to glow steadily when said other of said plurality of intercom stations goes off-hook.

2. An intercom system according to claim 1, wherein said first means includes
    a mechanical interrupter to provide said interrupted ringing signal bursts and said interrupted voltage, 3. An intercom system according to claim 2, wherein said second means includes
    a call selector circuit coupled to said first means and said plurality of intercom stations responsive to a call initiating signal identifying said other of said plurality of intercom stations from said one of said plurality of intercom stations to select one of a plurality of output lines; and
    a call routing circuit coupled to said call selector circuit to connect said one of said plurality of output lines to said another of said plurality of intercom stations to complete said connection.

4. An intercom system according to claim 3, wherein said call selector circuit includes
    a selector switch having said plurality of output lines,
    a stepping magnet means coupled to said selector switch to step said selector switch to said one of said plurality of output lines, said stepping magnet means being controlled by said call initiating signal, and
    a release magnet coupled to said stepping magnet means to enable said selector switch to return to its initial position when said call is terminated.

5. An intercom system according to claim 3, wherein said third means includes
    a first sampling circuit coupled to said plurality of intercom stations,
    a second sampling circuit coupled to said first sampling circuit,
    a third sampling circuit coupled to said first sampling circuit and said plurality of intercom stations, and
    logic circuitry coupled to said first, second and third sampling circuits and said first means to stop said interrupted ringing signal bursts and said interrupted voltage when any one of said first, second and third sampling circuits detects that both said one and said another of said plurality of intercom stations are off-hook.

6. An intercom system according to claim 1, wherein said second means includes
    a call selector circuit coupled to said first means and said plurality of intercom stations responsive to a call initiating signal identifying said other of said plurality of intercom stations from said one of said plurality of intercom stations to select one of a plurality of output lines; and
    a call routing circuit coupled to said call selector circuit to connect said one of said plurality of output lines to said another of said plurality of intercom stations to complete said connection.

7. An intercom system according to claim 6, wherein said call selector circuit includes
    a selector switch having said plurality of output lines,
    a stepping magnet means coupled to said selector switch to step said selector switch to said one of said plurality of output lines, said stepping magnet means being controlled by said call initiating signal, and
    a release magnet coupled to said stepping magnet means to enable said selector switch to return to its initial position when said call is terminated.

8. An intercom system according to claim 1, wherein said third means includes
    a first sampling circuit coupled to said plurality of intercom stations,
    a second sampling circuit coupled to said first sampling circuit,
    a third sampling circuit coupled to said first sampling circuit and said plurality of intercom stations, and
    logic circuitry coupled to said first, second and third sampling circuits and said first means to stop said interrupted ringing signal bursts and said interrupted voltage when any one of said first, second and third sampling circuit detects that both said one and said another of said plurality of intercom stations are off-hook.

9. An intercom system according to claim 1, wherein said second means includes
   a call selector circuit coupled to said first means and said plurality of intercom stations responsive to a call initiating signal identifying said other of said plurality of intercom stations from said one of said plurality of intercom stations to select one of a plurality of output lines; and
   a call routing circuit coupled to said call selector circuit to connect said one of said plurality of output lines to said another of said plurality of intercom stations to complete said connection.

10. An intercom system according to claim 9, wherein said call selector circuit includes
    a selector switch having said plurality of output lines,
    a stepping magnet means coupled to said selector switch to step said selector switch to said one of said plurality of output lines, said stepping magnet means being controlled by said call initiating signal, and
    a release magnet coupled to said stepping magnet means to enable said selector switch to return to its initial position when said call is terminated.

11. An intercom system according to claim 9, wherein said third means includes
    a first sampling circuit coupled to said plurality of intercom stations,
    a second sampling circuit coupled to said first sampling circuit,
    a third sampling circuit coupled to said first sampling circuit and said plurality of intercom stations, and
    logic circuit coupled to said first, second and third sampling circuits and said first means to stop said interrupted ringing signal bursts when any one of said first, second and third sampling circuits detects that both said one and said another of said plurality of intercom stations are off-hook.

* * * * *